Feb. 5, 1935.   E. L. BOWLES   1,989,677
ELECTRICAL SYSTEM
Filed Aug. 16, 1926   3 Sheets-Sheet 1

Inventor
Edward L. Bowles
by David Rines
Attorney

Feb. 5, 1935.  E. L. BOWLES  1,989,677
ELECTRICAL SYSTEM
Filed Aug. 16, 1926  3 Sheets-Sheet 2

Inventor
Edward L. Bowles
by David Rines
Attorney

Feb. 5, 1935.   E. L. BOWLES   1,989,677
ELECTRICAL SYSTEM
Filed Aug. 16, 1926   3 Sheets-Sheet 3
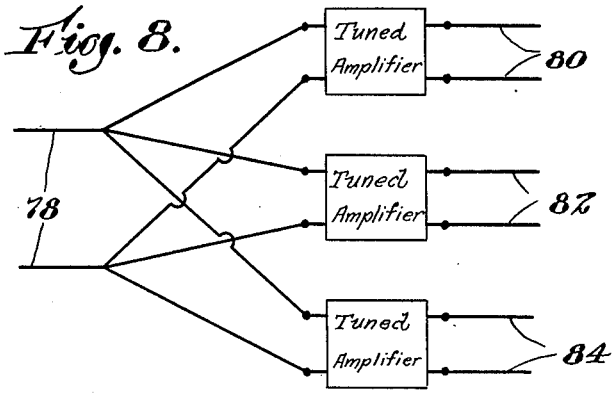
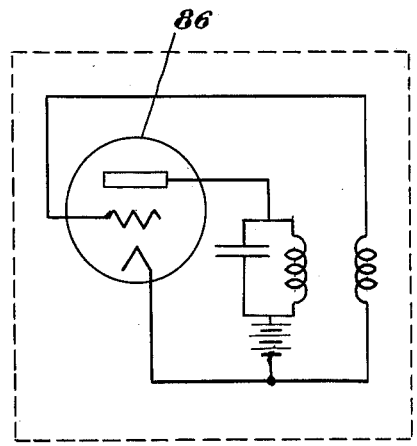
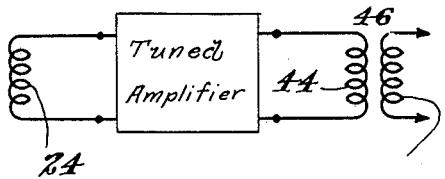
Inventor
Edward L. Bowles
by David Rines
Attorney Patented Feb. 5, 1935

1,989,677

UNITED STATES PATENT OFFICE 1,989,677

ELECTRICAL SYSTEM

Edward L. Bowles, Watertown, Mass.

Application August 16, 1926, Serial No. 129,498

29 Claims. (Cl. 175—183)

The present invention relates to electric systems, and more particularly to systems for the measuring of alternating-current phenomena. From a more specific aspect, the invention relates to vacuum-tube meters.

The measurement of alternating-current quantities, such as currents and voltages, is often rendered extremely difficult by the simultaneous presence in the circuit of currents or voltages of a number of different frequencies. To eliminate the effects of the currents or voltages of the undesired frequencies, several proposals have been made, among them the use of electro-mechanically tuned vibration galvanometers. A selective or tuned measuring circuit is thus provided, in which the current or the voltage of one desired frequency may be measured, to the exclusion of the others. Devices of this character are, however, very inflexible. As they are not adapted for use with wide ranges of frequencies, they can be used over but very small bands, and they are altogether impracticable for frequencies as high as 1000 cycles per second or more.

It is accordingly an object of the present invention to improve upon measuring instruments of the above-described character, to the end that the same instrument may be rendered operable over a very large range of frequencies, from the very lowest to the highest encountered in electrical work. The indicating apparatus itself may be of either direct-current or alternating-current type, but in all cases the circuits associated therewith are tuned electrically so as to eliminate the undesired frequencies.

Other and further objects will be explained hereinafter and will be particularly pointed out in the appended claims.

Figure 1:
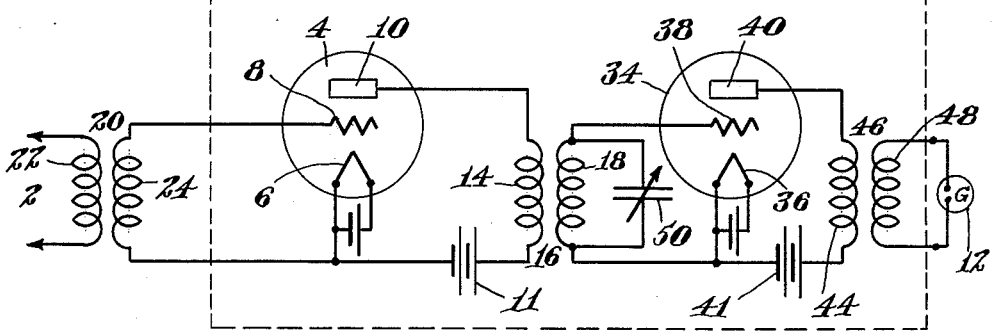
Figure 2:
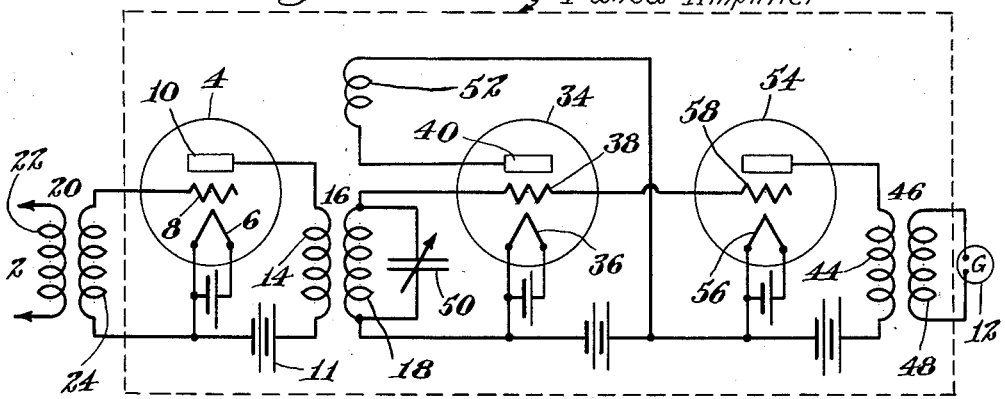

The invention will now be explained in connection with the accompanying drawings in which Fig. 1 is a diagrammatic view of circuits and apparatus constructed and arranged so as to illustrate the principle of the invention; Fig. 2 is a similar view of a preferred embodiment of the invention; and Figs. 3 to 9, illustrate modifications.

Figure 3:
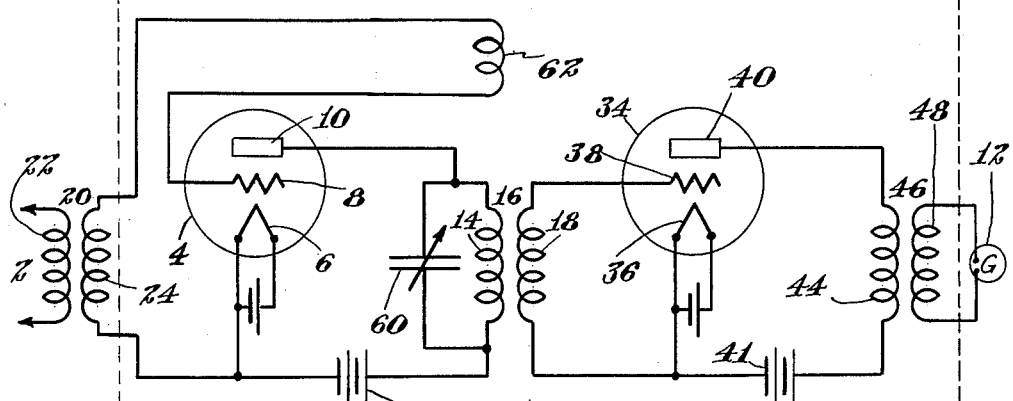
Figure 4:
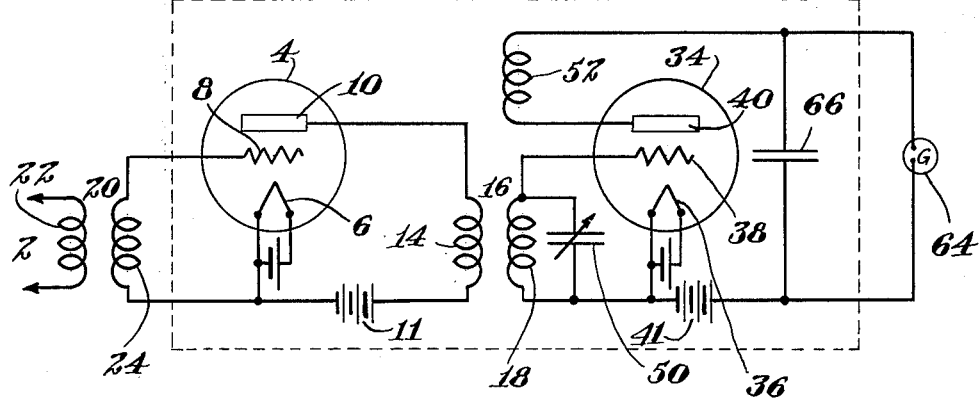
Figure 5:
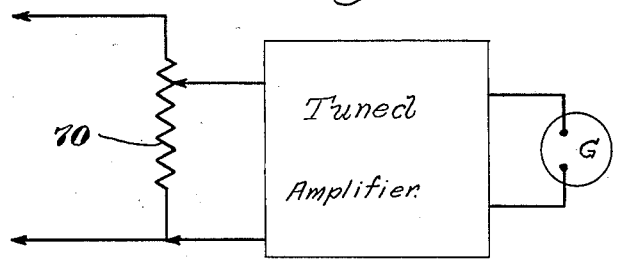

The principle of the invention is illustrated in Fig. 1, and different embodiments of the invention are illustrated in Figs. 2 to 9. The invention is illustrated in Figs. 2 to 4 as applied to the measurement of a source 2 of alternating voltage. It will be understood, however, that the invention is equally applicable to the measurement of other forms of alternating energy, like current, and that, in fact, certain features of the invention are not restricted to measurements at all, as is illustrated in connection with Figs. 7 to 9. The source 2 typifies any two points between which it is desired to determine the difference of electric potential. The voltage of the source is first amplified by means of an amplifier 4, shown as a vacuum tube or audion. To this end, the source 2 may be connected in the input circuit of the amplifier, between the filament 6 and the grid 8, as illustrated in Fig. 5 herein. It is preferred, however, to lead the energy from the source 2 into the input circuit of the amplifier 4 not directly, but indirectly, through the medium of an input transformer 20. The primary winding 22 of this transformer is directly connected with the source 2, and the secondary winding 24 is connected to the grid filament or input circuit of the amplifier 4. The transformer 20 may be of the variable, or adjustable-ratio, type, and the source 2, for instance, may then be connected with a tap (not shown) of the primary winding 22 or the grid by a tap (not shown) to the secondary winding 24.

The amplified energy traverses the amplifier output circuit, that is connected between the filament 6 and the plate 10 in series with a battery 11. A primary winding 14 of an output transformer 16 is connected in the output circuit and the secondary winding 18 of the transformer is connected in the input circuit of a second space-current device 34, between the filament 36 and the grid 38. A primary winding 44 of an output transformer 46 is connected in the output circuit of the space-current device 34, between the filament 36 and the plate 40 in series with a battery 41. A suitably calibrated alternating-current galvanometer or voltmeter or ammeter 12 is connected in circuit with the secondary winding 48 of the transformer 46. The calibration of the meter 12 may be effected in any desired manner, as by applying known, alternating voltages at the source 2 and observing the corresponding deflections of the meter 12.

The input circuit of the space-current device 34 is rendered tunable by means of a variable condenser 50, across the winding 18. The inductive winding 14 is coupled to the tuned input circuit of the space-current device 34, which comprises the inductive winding 18 and the condenser 50. The voltage or current from the source 2 that is fed through the input transformer 20 into the circuits of the space-current device 4 is thus, in turn, fed into the tuned input circuit of the space-current device 34, through the transformer 16. This input circuit will be properly tuned by means of the condenser 50.

According to a feature of the present invention, as illustrated, for example, in Figs. 2 and 4, the selectivity of the tuned, input circuit 18, 50 is improved through the introduction of negative resistance as by regeneratively coupling it to the corresponding output circuit, to cause it to respond best to voltage or current of the particular, desired frequency in the winding 14. All the undesired frequencies will thus be eliminated from the alternating voltage or current transmitted to the output circuit of the space-current device 34, and the voltage or current of the selected or tuned frequency may then be readily measured by the alternating-current instrument 12, to which it is fed through the output transformer 46 or by the direct-current instrument 64, for example.

As illustrated in Fig. 2, the regenerative coupling may be effected by means of a feed-back winding 52 in the output circuit of the tube 34 coupled to the inductive winding 18 in the input circuit. For an impressed voltage of a given frequency, a relatively large voltage will thus be produced between the grid 38 and the filament 36 of the space-current device 34. For the same impressed voltage of other frequencies, however, the voltage on the grid 38 will be smaller and smaller as the frequency departs more and more from the resonant frequency of the tuned circuit 14, 18, 50 combination. The presence of the winding 44, as illustrated in Fig. 1, in the output circuit of the space-current device 34 may, in this case, disturb the conditions for rengeneration by means of the inductive winding 52, were the latter in series with the winding 44. In Figure 2, the winding 44 is, in this embodiment, therefore, inserted in the output circuit of still a third space-current device 54, the input circuit of which is coupled to the input circuit of the space-current device 34 in any desired way, as by connecting the filament 56 of the space-current device 54 with the filament 36 of the space-current device 34 and the grid 58 of the former with the grid 38 of the latter. The galvanometer 12 is connected, as before, in circuit with the winding 48.

The use of the tube 4 serves not only to amplify the alternating-current quantities of the source 2, but also electrically to separate or isolate the output circuit of the tube 4, together with a coupled input circuit of the amplifier tube 34, thus making it possible to adjust or tune one or the other or both of these circuits without in any way affecting the input characteristics of the tube 4 as seen from the source 2. Any change in the nature of the impedance of the source 2 would likewise in no way affect or react upon the output circuit of the tube 4 or the input circuit of the tube 34. The freedom from mutual coupling of the input circuit of the tube 4 and the circuit between the tube 4 and the tube 34 is extremely important if calibration, sensitivity, selectivity and stability are to be maintained. In the case of the regenerative circuit of Fig. 2, this isolation is even more important because of the critical nature of the regeneration, together with the greater selectivity and sensitivity it engenders. If the regenerative amplifier 34 of Fig. 2 were connected directly to the source 2 of voltage, the effective degree of regeneration would differ with each different source 2 to which the amplifier 34 were connected and this would result in disturbing the selectivity and the meter sensitivity as well as the circuit stability. Particularly, for meter purposes, the isolating tube makes it possible to connect such a device for measuring purposes into circuits of varying impedance without in any way upsetting those circuits or in any way interfering with the meter characteristics themselves.

Instead of tuning the input circuit of the space-current device 34, the output circuit of the space-current device 4 may be tuned, as by means of a variable condenser 60 in parallel with the winding 14, illustrated in Fig. 3. Regeneration may then be effected by means of a winding 62 in the input circuit of this space-current device, coupled to the winding 14 in the output circuit. This system has certain disadvantages but, on the other hand, the additional space-current device 54 of Fig. 2 is not required here.

It will be understood that the resonance response may be made sharp or dull, and the frequency of response varied, by varying the relation between the windings 14, 18, 52 and the condenser 50 (Fig. 2) or the windings 14, 18, 62 and the condenser 60 (Fig. 3), thus rendering the instrument very flexible.

According to the modification of the invention illustrated in Fig. 4, the space-current device 34 is caused to act as a rectifier or detector at the same time that it operates as a regenerative amplifier. This may be done in any well known way, as by the application of proper connections to effect grid rectification, as by the use of a grid leak and condenser, and so on. The operation is otherwise the same as already described, except that the measurement of the impressed voltage is effected by means of a direct-current galvanometer 64 disposed in the output circuit of the audion 34. A condenser 66 is disposed in parallel to the galvanometer for the purpose of offering an easy path for the alternating currents of this circuit, which might otherwise encounter a high impedance in the galvanometer, consequently suppressing regeneration.

In the circuit of Figs. 2 and 4, for example, it will be found that for a given setting of the winding 52 with magnetic relation to the winding 18, there will be an optimum value for the magnetic coupling between the windings 14 and 18. It will therefore be advantageous to have the coupling between the windings 14 and 18 and 52 and 18, or both, variable.

The invention may be used as a frequency analyzer to determine the magnitudes of the different constituent frequencies in a complex wave, as will now be explained in connection with Fig. 5. Let it be assumed that current (or voltage) of a complex periodic wave is present in the resistor 70. Such a wave, as is well known, may be resolved into a corresponding fundamental wave, together with a number of its harmonics or overtones. The presence of the current in the resistor 70 will produce a voltage drop which is itself represented by a complex wave that is proportional, in every respect, to the current. For brevity, let that portion of the system shown in dotted lines in Figs. 2 to 4 be denoted by the term "tuned amplifier". If, now, the input of any of these tuned amplifiers is connected across the resistor 70, or across a portion of the same, it will be possible, by successively tuning this tuned amplifier to the constituent fundamental and harmonic frequencies of the compex wave, to determine their individual relative amplitudes in a mutually exclusive manner, by merely inspecting the readings of the galvanometer 12. The present invention, therefore, provides for effecting very simply and easily by this special experimental means what is ordinarily performed by tedious, involved mathematical analysis of the original complex wave, itself, which mathematical analysis, furthermore, is, at best, only approximate, because of errors of physical measurements of the amplitudes of the necessary ordinates of the oscillogram of the wave.

Figure 6:
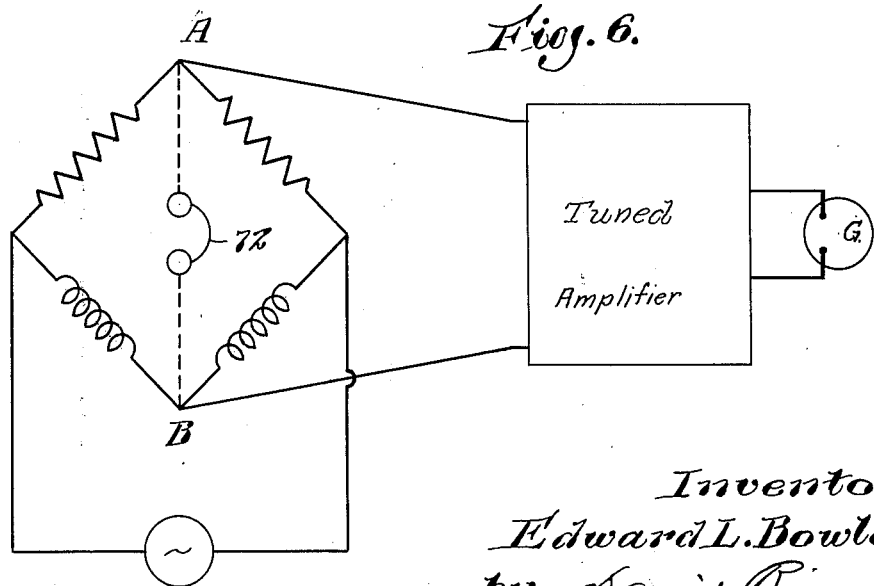

As an application of the present invention to measurements of a different type than above described, the Wheatstone-bridge arrangement illustrated in Fig. 6 may be considered. In Wheatstone-bridge measurements, where null methods are involved, a balance of the bridge is indicated by a zero voltage difference between the points A and B. Often, the measurement of an electrical coefficient, such as inductance, is made at one frequency only. If this frequency is within the audible range, a balance of the bridge is normally indicated by silence, or no current, or by some indication of no voltage between the points A and B through a pair of telephones 72 connected directly between the parts A and B, as illustrated in dotted lines. This balance is difficult, if not impossible, to obtain, if harmonic or overtone voltages appear between the points A and B at balance, when the bridge is balanced for the intended fundamental frequency. These harmonics may arise due to a power source of poor wave form, or again, they may arise from non-linearity of one or more elements of the bridge arms. A balance at the fundamental frequency does not necessarily mean a balance at the harmonics also, and a disturbing harmonic current may often be heard in the telephones 72, vitiating the balance for the fundamental. The use of the tuned amplifier of the present invention, connected at one side between the points A and B, as illustrated, and at the other to the galvanometer 12 or the telephones 72, will eliminate the undesired harmonics when tuned to the fundamental frequency, while readily indicating the zero fundamental voltage. The telephones 72 or similar devices may be used instead of the galvanometer 12 when the frequency is within the audio range, making it possible for the ear, instead of the eye, to detect the zero voltage difference between the points A and B. When so used, the telephones 72 will not detect the harmonic voltages that would confuse the observer if they were connected directly between the points A and B, as illustrated by the said dotted lines in Fig. 6. The telephones 72 may, in fact, be connected directly in the output circuit of the space-current device 54 of Fig. 2, for example. There is no limit to the frequency range of such a device, and it eliminates all possibility of trouble in bridge measurements introduced by harmonics, removing all disturbing sounds of other components or parasitic frequencies, while, nevertheless, acting as an amplifier.

In Fig. 7, the tuned amplifier is shown inserted in a transmission line, to be used as a repeater, to select one frequency or a small band of frequencies and then to send it on. The incoming line 74 is connected to the input circuit of the tuned amplifier and the outgoing line 76 to the output circuit of the space-current device 34 or 54, as the case may be. The tuned amplifier is not, necessarily, used to the exclusion of other apparatus, as such other apparatus may be inserted in the transmission line in combination with it, or for control purposes, or for the purpose of rendering two-way amplification, the latter an artifice common in telephone repeater operation.

Again, the tuned amplifier of the present invention may be used in the transmission of electric energy where several waves differing in frequency are transmitted over the same pair of incoming wires 78, Fig. 8, but which are to be separated at a receiving station and sent on along independent wires 80, 82 and 84 one pair for each wave. Ordinarily, a wave filter is used at the receiving station for such purpose. The tuned amplifier may be effectively used in place of such filter.

As a further important application of the invention, it may be used in audion oscillators where a very pure power output is desired. The ordinary audion oscillator 86, Fig. 9, as is well known, produces a current wave containing harmonic constituents, since the audion, when in oscillation, does not operate entirely on the linear portion of its volt-ampere characteristic. These harmonics are often of considerable magnitude and, therefore, objectionable. In order to obtain a pure-wave form from such an audion oscillator, it may, for example, be coupled in any desired way to the winding 24 of the input circuit of the tuned amplifier of the present invention, and this amplifier could then be tuned to the fundamental or some harmonic frequency of the constituent frequencies of the oscillator, which it would amplify to the substantial exclusion of all other frequencies. It is thus possible to select the fundamental frequency alone, for example, and use that alone. As the output wave in the coil 44 is relatively pure, all that is necessary, in order to obtain a pure output wave in the circuit where the power is used, is to couple such circuit to the coil 44.

This is on the assumption,—which is true in fact,—that the regeneratively tuned amplifier, in combination with the oscillator 86, has a virtue superior to that of the oscillator 86 alone; for in the oscillator, as before explained, the output-circuit voltage travels between wide limits that include curved portions of the current and voltage characteristics, while in the tuned amplifier, which is operated by forced vibrations only, the operating region on the output-current, output-voltage characteristic may be predetermined by proper adjustment of the grid and plate voltages. Thus, by applying but a small voltage to the coil 24, the range of operation on the output-voltage, output-current characteristic may be made to agree with a substantially linear portion of that characteristic. The output-current variations may thus be made to be of substantially the fundamental frequency only. It would be impossible to obtain a current of harmonic frequency in the coil 44 on the assumption of perfect selectivity in the tuned amplifier together with operation on a linear characteristic.

It will be understood that the invention is not limited to the exact embodiments thereof that are illustrated and described herein, but that modifications may be made by persons skilled in the art without departing from its spirit and scope, as defined in the appended claims.

What is claimed is:

1. A frequency analyzer comprising a resistance in which current or voltage of complex wave form is present, circuits connected with the resistance, means for tuning the circuits and for regeneratively coupling the circuits to suppress successively from the circuits all alternating currents or voltages except currents or voltages of predetermined frequencies, and means for measuring the amplitudes of the said currents or voltages of the individual frequencies.

2. A frequency analyzer comprising a resistance in which current or voltage of complex wave form is present, circuits connected with the resistance, means for tuning the circuits and for regeneratively coupling the circuits to suppress successively from the circuits all alternating currents or voltages except currents or voltages of predetermined frequencies, and an electric-measuring instrument connected with the circuits, the instrument being calibrated to measure the amplitudes of the said currents or voltages of the individual frequencies.

3. A selective electric system comprising an incoming line, an outgoing line, non-oscillatory circuits connecting the lines, means for tuning the circuits and for regeneratively coupling the circuits to suppress successively from the circuits all alternating currents or voltages passing into the circuits from the incoming line toward the outgoing line except currents or voltages of predetermined frequencies passing from the incoming line toward the outgoing line, and means for transmitting the said current or voltages of predetermined frequencies.

4. An electric meter comprising an isolating space-current device having an input circuit and an output circuit coupled together, means for connecting with the input circuit a source of alternating current or voltage, an amplifier space-current device having an input circuit and an output circuit coupled together, the input circuit of the amplifier space-current device being coupled to the output circuit of the isolating space-current device to isolate the amplifier space-current device from the source, means for regeneratively tuning one of the space-current devices to a predetermined frequency, and means for measuring the alternating current quantities corresponding to the said predetermined frequency.

5. An electric meter comprising an isolating space-current device having an input circuit and an output circuit coupled together, means for connecting with the input circuit a source of alternating current or voltage of a plurality of frequencies, a further circuit connected with the output circuit so as to be isolated by the isolating space-current device from the source, means for regeneratively tuning the further circuit to suppress from the further circuit all the said frequencies except a predetermined frequency, and means for measuring the alternating-current quantities corresponding to the said predetermined frequency.

6. An electric meter comprising an isolating space-current device having an input circuit and an output circuit coupled together, means for connecting with the input circuit a source of alternating current or voltage of a plurality of frequencies, an amplifier space-current device having an input circuit and an output circuit coupled together, the input circuit of the amplifier space-current device being coupled to the output circuit of the isolating space-current device to isolate the amplifier space-current device from the source, means for tuning one of the two last-named circuits and for regeneratively coupling the input and output circuits of one of the space-current devices to suppress all the said frequencies except a predetermined frequency, and means for measuring the alternating current quantities corresponding to the said predetermined frequency.

7. An electric meter comprising an isolating space-current device having an input circuit and an output circuit coupled together, means for connecting with the input circuit a source of alternating current or voltage of a plurality of frequencies, an amplifier space-current device having an input circuit and an output circuit coupled together, the input circuit of the amplifier space-current device being coupled to the output circuit of the isolating space-current device to isolate the amplifier space-current device from the source, means for tuning one of the two last-named circuits and for regeneratively coupling the input and output circuits of one of the space-current devices to suppress all the said frequencies except a predetermined frequency, and an electric measuring instrument connected with the amplifier space-current device, the instrument being calibrated to measure the alternating-current quantities corresponding to the said predetermined frequency.

8. An electric meter comprising an isolating space-current device having an input circuit and an output circuit coupled together, means for connecting with the input circuit a source of alternating current or voltage of a plurality of frequencies, an amplifier space-current device having an input circuit and an output circuit coupled together, the input circuit of the amplifier space-current device being coupled to the output circuit of the isolating space-current device to isolate the amplifier space-current device from the source, means for tuning one of the two last-named circuits and for regeneratively coupling the circuits of one of the space-current devices to suppress all the said frequencies except a predetermined frequency, a transformer having a winding connected with the amplifier space-current device and a second winding, and an alternating current measuring instrument connected with the second winding, the instrument being calibrated to measure the alternating-current quantities corresponding to the said predetermined frequency.

9. An electric meter comprising an isolating space-current device having an input circuit and an output circuit coupled together, means for connecting with the input circuit a source of alternating current or voltage of a plurality of frequencies, an amplifier space-current device having an input circuit and an output circuit coupled together, the input circuit of the amplifier space-current device being coupled to the output circuit of the isolating space-current device to isolate the amplifier space-current device from the source, means for tuning one of the two last-named circuits and for regeneratively coupling the circuits of one of the space-current devices to suppress all the said frequencies except a predetermined frequency, a third space-current device having an input circuit and an output circuit coupled together, means connecting the input circuit of the third space-current device to the input circuit of the amplifier space-current device, and means for measuring the alternating current quantities corresponding to the said predetermined frequency in the output circuit of the third space-current device.

10. An electric meter comprising a non-oscillatory amplifier having an input circuit and an output circuit coupled together, means for connecting with the input circuit a source of alternating current or voltage of a plurality of frequencies, means for tuning one of the circuits and for coupling the circuits regeneratively to suppress all the said frequencies except a predetermined frequency, and means for measuring the alternating-current quantities corresponding to the said predetermined frequency.

11. An electric meter comprising a non-oscillatory amplifier having an input circuit and an output circuit coupled together, means for connecting with the input circuit a source of alternating current or voltage of a plurality of frequencies, means for tuning one of the circuits and for coupling the circuits regeneratively to suppress all the said frequencies except a predetermined frequency, and an electric measuring instrument connected with the amplifier, the instrument being calibrated to measure alternating-current quantities corresponding to the said predetermined frequency.

12. A frequency analyzer comprising a resistance in which current or voltage of complex wave form is present, a non-oscillatory amplifier having an input circuit connected with the resistance and an output circuit coupled with the input circuit, means for tuning one of the circuits and for coupling the circuits regeneratively to suppress successively from the circuit all alternating currents or voltages except currents or voltages of a predetermined frequency, and means for measuring the alternating-current quantities corresponding to the said predetermined frequency.

13. A frequency analyzer comprising a resistance in which current or voltage of complex wave form is present, an isolating space-current device having an input circuit connected with the resistance and an output circuit coupled to the input circuit, an amplifier space-current device having an input circuit and an output circuit coupled together, the input circuit of the amplifier space-current device being coupled to the output circuit of the isolating space-current device to isolate the amplifier space-current device from the resistance, means for tuning one of the two last-named circuits and for regeneratively coupling the input and output circuits of one of the space-current devices to suppress successively from the circuit all alternating currents or voltages except currents or voltages of predetermined frequencies, and means for measuring the amplitudes of the alternating-current quantities corresponding to the individual frequencies.

14. An audio-frequency electric meter comprising an isolating space-current device having an input circuit and an output circuit coupled together, means for connecting with the input circuit a source of alternating current or voltage of a plurality of audio frequencies, an amplifier space-current device having an input circuit and an output circuit coupled together, the input circuit of the amplifier space-current device being coupled to the output circuit of the isolating space-current device to isolate the amplifier space-current device from the source, means for tuning one of the two last-named circuits and for regeneratively coupling the input and output circuits of one of the space-current devices to suppress all one of the said frequencies except a predetermined frequency, a third space-current device having an input circuit and an output circuit coupled together, means connecting the input circuit of the third space-current device to the input circuit of the amplifier space-current device, and an audio-frequency measuring instrument connected with the output circuit of the third space-current device.

15. An electric system comprising a source of alternating current or voltage having a plurality of frequencies, a space-current device, a circuit coupled to the source and connected with the device, and means for regeneratively tuning the circuit to suppress from the circuit all the said frequencies except those of predetermined frequencies, whereby a pure wave is obtained.

16. An electric system comprising a source of alternating current or voltage of a plurality of frequencies, an amplifier having an input circuit coupled to the source and an output circuit, and means for regeneratively tuning the amplifier to suppress all the said frequencies except predetermined frequencies, whereby a pure wave is obtained.

17. An electric system comprising a source of alternating current or voltage of a plurality of frequencies, an amplifier having an input circuit coupled to the source and an output circuit, a second amplifier coupled to the output circuit, and means for regeneratively tuning one of the amplifiers to suppress all the said frequencies except predetermined frequencies, whereby a pure wave is obtained.

18. An electric system comprising a source of alternating current or voltage of a plurality of frequencies, an amplifier having an input circuit coupled to the source and an output circuit, a second amplifier having an input circuit coupled to the output circuit, of the first-named amplifier and an output circuit, means for regeneratively tuning one of the amplifiers to suppress all the said frequencies except predetermined frequencies, and a space-current device having an input circuit coupled to the input circuit of the second amplifier.

19. An electric system comprising an incoming line, a plurality of outgoing lines, a plurality of circuits each connecting the incoming line with one of the outgoing lines, and means for regeneratively tuning each of the circuits to prevent alternating-current quantities of a plurality of predetermined frequencies passing from the incoming line to each of the outgoing lines.

20. An electric system comprising a source of alternating current or voltage having a plurality of audio frequencies, a space-current device, a circuit coupled to the source and connected with the device, and means for regeneratively tuning the circuit to suppress from the circuit all the said frequencies except those of predetermined frequencies, whereby a pure wave is obtained.

21. An electric meter comprising a non-oscillatory amplifier having an input circuit and an output circuit coupled together, means for connecting with the input circuit a source of alternating current or voltage of a plurality of frequencies, means for tuning one of the circuits and for introducing negative resistance into the said one circuit to suppress all the said frequencies except a predetermined frequency, and means for measuring the alternating-current quantities corresponding to the said predetermined frequency.

22. An electric indicating device comprising a non-oscillatory amplifier having an input circuit and an output circuit coupled together, means for connecting with the input circuit a source of alternating current or voltage of a plurality of frequencies, means for tuning one of the circuits and for coupling the circuits regeneratively to suppress all the said frequencies except a predetermined frequency, and means for indicating the alternating-current quantities corresponding to the said predetermined frequency.

23. An electric system comprising an amplifier having an input circuit and an output circuit coupled together, means for connecting with the input circuit a source of alternating current or voltage of audio frequency, and means for regeneratively tuning one of the circuits to a predetermined audio frequency.

24. An electric system comprising an amplifier having an input circuit and an output circuit coupled together, means for connecting with the input circuit a source of alternating current or voltage of audio frequency, and means for introducing negative resistance into one of the circuits and for tuning the said one circuit to a predetermined audio frequency.

25. An electric system comprising a source of alternating current or voltage of a plurality of frequencies and means for obtaining from said source an output wave of a single predetermined frequency comprising a space-current device, a circuit coupled to the source and connected with the device, and means for regeneratively tuning the circuit to suppress from the circuit all the said frequencies except the said predetermined frequency.

26. An electric system comprising a source of alternating current or voltage of a plurality of frequencies, and means for obtaining from said source an output wave of a single, predetermined frequency comprising an amplifier having an input circuit coupled to the source and an output circuit, and means for regeneratively tuning the amplifier to suppress all the said frequencies except the said predetermined frequency.

27. An electric system comprising a source of alternating current or voltage of a plurality of frequencies, and means for obtaining from said source an output wave of a single predetermined frequency comprising an amplifier having an input circuit coupled to the source and an output circuit, a second amplifier coupled to the output circuit, and means for regeneratively tuning one of the amplifiers to suppress all the said frequencies except the said predetermined frequency.

28. An electric system comprising a source of alternating current or voltage of a plurality of frequencies, and means for obtaining from said source an output wave of a single predetermined frequency comprising an amplifier having an input circuit coupled to the source and an output circuit, a second amplifier having an input circuit coupled to the output circuit of the first-named amplifier and an output circuit, means for regeneratively tuning one of the amplifiers to suppress all the said frequencies except the said predetermined frequency, and a space-current device having an input circuit coupled to the input circuit of the second amplifier.

29. An electric system comprising an unmodulated oscillator constituting a source of unmodulated alternating current or voltage of a plurality of frequencies, the oscillator having an input circuit and an output circuit, and means for obtaining from said output circuit an unmodulated output wave of a single predetermined frequency comprising a space-current device, a circuit coupled to said output circuit and connected with the device, and means for regeneratively tuning the circuit to suppress from the circuit all the said frequencies except the said predetermined frequency.

EDWARD L. BOWLES.